United States Patent [19]
Evans

[11] 3,873,076
[45] Mar. 25, 1975

[54] ANNULAR BUMPER GUARD FOR FLOATING VESSELS

[76] Inventor: Orde R. Evans, P.O. Box 51303, O.C.S., Lafayette, La. 70501

[22] Filed: Oct. 26, 1973

[21] Appl. No.: 410,187

[52] U.S. Cl. .................... 267/140, 114/219, 61/48
[51] Int. Cl. .............................................. F16f 7/12
[58] Field of Search .................. 267/139, 140, 152; 114/219; 61/48

[56] References Cited
UNITED STATES PATENTS

| | | | |
|---|---|---|---|
| 3,464,214 | 9/1969 | King | 114/219 |
| 3,606,295 | 9/1971 | Appleton | 267/140 |
| 3,788,260 | 1/1974 | Morini | 114/219 |

*Primary Examiner*—James B. Marbert
*Attorney, Agent, or Firm*—Jack W. Hayden

[57] ABSTRACT

An annular elastomer member is provided with a central opening and has an outer circumferential edge generally perpendicular to the top and bottom surface. The central opening is spaced inwardly from the outer circumferential edge and a plurality of circumferentially spaced openings are provided in the elastomer member between the opening and the circumferential edge.

One of the surfaces is provided with an annular groove which is generally V-shaped in cross section and extends around the surface in spaced relation to each the central opening and the circumferential edge. The other surface is provided with a V-shaped groove so that the members may be stacked to provide a guard of desired vertical extent, with a support engaged at each end of the stacked elastomer members for positioning in relation to a structure.

The central opening is provided with a plurality of spaced recesses with projections therebetween, which with the circumferentially spaced openings absorb movement of the elastomer members upon contact to inhibit damage thereto.

3 Claims, 4 Drawing Figures

PATENTED MAR 25 1975 3,873,076

ANNULAR BUMPER GUARD FOR FLOATING VESSELS

SUMMARY OF THE INVENTION

Where structures are positioned in offshore or water covered areas, such as by way of example, such structures employed to support apparatus for drilling and completing and producing oil and gas wells, it is desirable to provide some type of arrangement to prevent contact of floating vessels with the structures.

Since such structures are normally embedded in the submerged land of the water covered area, wind and wave action on floating vessels such as barges and the like may cause substantial relative movement between the floating vessel and the fixed structure. In order to prevent damage to either the floating vessel or the fixed structure, it is desirable to provide a bumper or guard for each leg or portion of the structure with which the floating vessel may come in contact so as to aid in cushioning the shock of contact of the vessel and structure.

The present invention overcomes this problem in that it provides an elastomer body having a configuration so that it yields not only due to the elastomer, but by reason of such configuration.

The elastomer body or member also includes a configuration so that a plurality of such annular members may be stacked in vertical relationship to form a bumper or guard of desired vertical extent.

Another object of the present invention is to provide a plurality of annular elastomer members which may be stacked and a plurality of circumferentially spaced openings which along with a central opening act as cushions for receiving the elastomer when deformed by contact and support means to position the plurality of vertically arranged guards in relation to a structure.

Other objects and advantages of the invention will become apparent from a consideration of the following description and drawings.

DESCRIPTION OF THE PREFERRED EMBODIMENT

Figure 3:
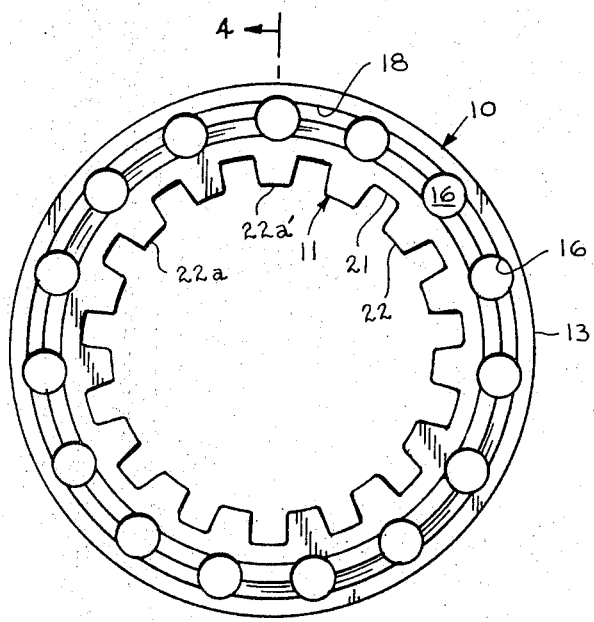
FIG. 3 is a plan view of the preferred form of the annular elastomer member of the present invention.
Figure 4:
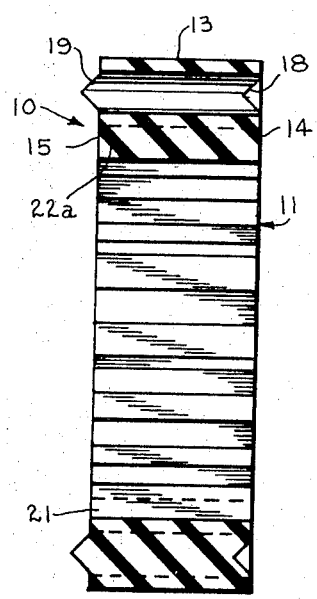
FIG. 4 is a sectional view on the line 4—4 of FIG. 3.

Attention is first directed to FIGS. 3 and 4 wherein an annular elastomer member referred to generally by the numeral 10 is shown and includes a central opening referred to generally at 11 therein. The annular elastomer member 10 includes a circumferential, substantially vertically extending outer edge 13 with an annular top surface 14 extending from such circumferential outer edge 13 to the central opening 11 and a bottom annular surface 15 substantially parallel to the top surface 14 extending from the outer circumferential edge 13 to the central opening 11. A plurality of circumferentially spaced openings 16 extend through the annular member 10 and are spaced from the outer circumferential edge 13 and from the central opening 11 as more clearly seen in FIGS. 3 and 4.

Figure 2:
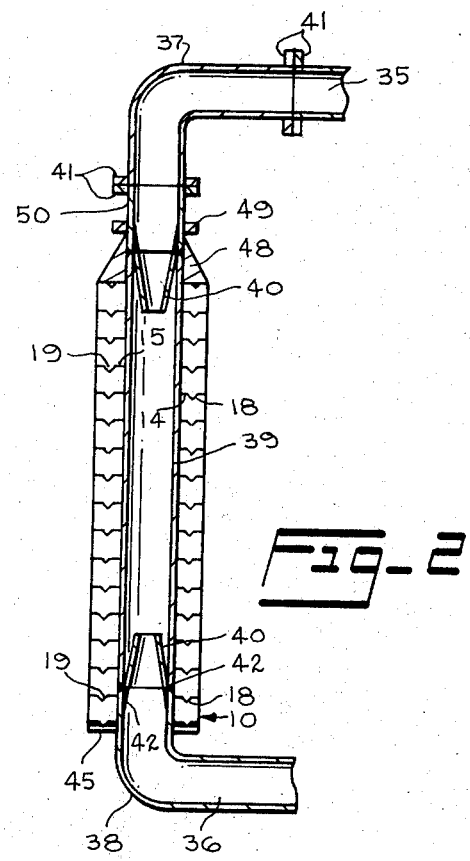
FIG. 2 is a sectional view of the stacked annular elastomer members shown in FIG. 1 and a form of a support member.

One of the surfaces such as the top surface 14 is provided with an annular groove 18 which is generally V shaped in cross section while the other or bottom surface 15 is provided with a projection 19 which is also generally V shaped in cross section to conform with the configuration of the groove 18. The groove 18 and projection 19 coincide at least partially with tthe openings 16 as shown in FIGS. 3 and 4 and the groove 18 and projections 19 form a means for nesting or stacking a plurality of annular elastomer members 10 in vertical relationship as shown in FIG. 2 to form a bumper or guard of desired vertical extent.

Figure 1:
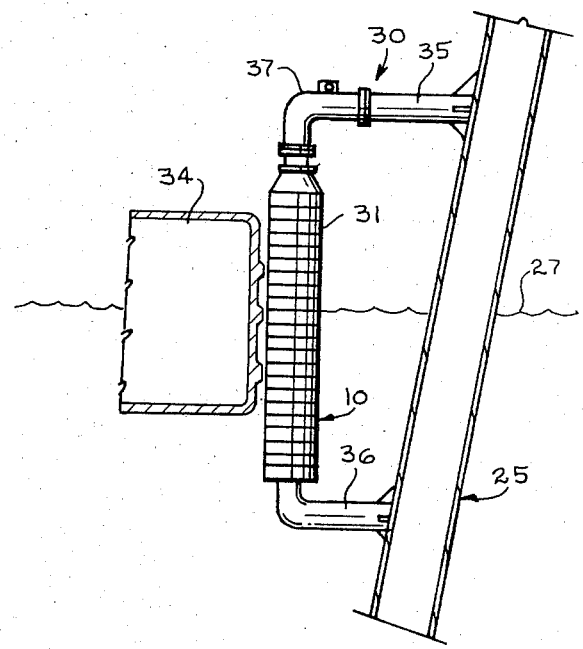
FIG. 1 is a schematic illustration showing a portion of a structure with a support means secured thereto and a plurality of the annular elastomer members of the present invention in stacked relationship on the support member to act as a bumper or guard for a floating vessel in a water covered area.

When the annular members 10 are thus stacked, the projection 19 is received within the groove 18 of the next adjacent member 10 to aid in positioning and maintaining the annular elastomer members in vertical relationship to each other while accommodating flexing of some of the annular members relative to the other annular members when contacted by a vessel as illustrated in FIG. 1.

The central opening 11 is formed by a plurality of recesses 21 which are separated by a plurality of projections 22 therebetween with the recesses extending towards the outer circumferential edge and the projections extending in an opposite direction to provide additional desired absorption or impact characteristics when the arrangement is contacted by a vessel such as a barge or the like. As shown, such recesses and projections are radial in extent, with the recesses and projections being generally rectangular. The inner edge 22a' of the recesses provides a surface 22a for contacting the members 39 when the members 10 are deformed to aid in distributing the impact of the vessel over the combined areas of the surfaces 22a and this along with recesses 21 reduce tendency of the member 10 to rupture, while absorbing the shock of the impact. The surfaces 22a may abut the outer periphery of member 39 as shown in FIG. 2; however, the recesses 21 and openings 16 provide voids for receiving the elastomer when it is moved by impact and the grooves 18 and projection 19 aid in realigning the members after impact loading is removed.

In FIG. 1 a portion of a structure in a water covered area is illustrated generally at 25, such structure including portions extending downwardly into the submerged surface (not shown) beneath the water covered area illustrated at 27. Any suitable form of support means as illustrated at 30 may be mounted on the structural member 25 with which the vessel 34 may come in contact for positioning a stack 31 of the annular members 10 in spaced relation to the structure 25 to inhibit contact of the floating vessel 34 with the structure 25.

As shown in FIGS. 1 and 2, the support structure 30 includes arms 35 and 36 extending laterally from the structure 25. An elbow 37 may be secured to the laterally extending member 35 and the outer end of lateral member 36 may be bent to form an elbow as shown at 38 and a tubular member 39 is supported on such elbow as shown in FIG. 2. If desired a conically shaped member 40 may be provided on each end of the elbows for fitting within the tubular member 39 and the elbow 37 may be connected to the lateral member 35 by suitable means such as flanges 41 or the like on each which may be welded, bolted or otherwise secured together.

In assembling the guard of the present invention, it may be done on location at the structure or on shore and then placed in position on the structure at location. The lateral member 36 is provided with a bottom annular plate or support 45 which receives the lowermost of the annular elastomer members 10 having the configuration previously described herein. The plate 45 may be welded or otherwise secured to the elbow 38. Thereafter, the conical member 40 and the tubular member 39 are secured to the lateral member 36 by welds 42 or the like and a desired number of elastomer members 10 then placed in stacked position or relationship about the vertically extending tubular member 39 to form a bumper of desired vertical extent. Thereafter the cap 48 and retainer ring 49 are slipped over the tubular extension or sub 50 and the sub 50 is welded to the conical member 40.

The extention or sub 50 is then welded to the upper end of 39 and the cap 48 and retained ring 49 lowered so that 48 abuts the uppermost annular member 10 and ring 49 is then secured in position by welds or the like. The sub 50 may then be secured to the elbow 37 by the flange 41 at its upper end to the flange on the lower end of elbow 37.

From the foregoing description it can be appreciated that the configuration of the central opening 11 including the spaced recesses and projections 22 along with openings 16 provide a substantial amount of void space within each of the annular elastomer members.

Thus, when a floating vessel such as that partially illustrated at 34 in FIG. 1 contacts the stack of elastomer members, the shock of impact is absorbed and damage or repture of the elastomer member is inhibited since such elastomer may flex due to the recesses 21 and the opening 16.

Since, the bumber is annular in configuration, it can be appreciated that it protects the structure 25 on which it is positioned from engagement with a floating vessel regardless of the relative angle between the floating vessel 34 and structure 25 since such annular member extends a full 360 degrees.

The foregoing disclosure and description of the invention are illustrative and explanatory thereof, and various changes in the size, shape, and materials as well as in the details of the illustrated construction may be made without departing from the spirit of the invention.

What is claimed is:

1. A guard for preventing damage by contact of floating vessels with structures in water covered areas comprising:
   a. an annular elastomer member having a central opening and an outer circumferential edge spaced therefrom;
   b. said member having a plurality of circumferentially spaced openings therein and extending through said member between the central opening and said outer circumferential edge of said annular member;
   c. said annular member having top and bottom surfaces;
   d. one of said surfaces having a recess therein;
   e. the other of said surfaces having a projection therein whereby said annular members may be stacked with the bottom surfaces of each engaging the top surface of the next adjacent member and with said projection engaging in the recess;
   f. support means for engaging in the central opening of a plurality of stacked annular members to position them in relation to a structure as a guard; and
   g. the central opening being defined by a plurality of recesses separated by projections extending circumferentially of the central opening, with the recesses extending toward the outer circumferential edge, with the projections having an inner surface for contact with the support member upon impact.

2. The invention of claim 1 wherein said annular projection and annular groove at least partially coincide with the circumferentially spaced openings in said body.

3. The invention of claim 1 wherein the recesses and projections are generally rectangular in configuration.

* * * * *